Patented Aug. 13, 1946

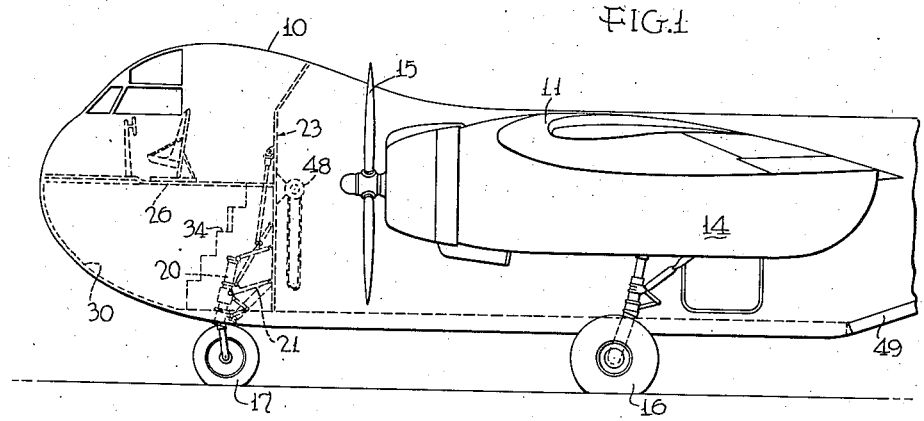
FIG.1
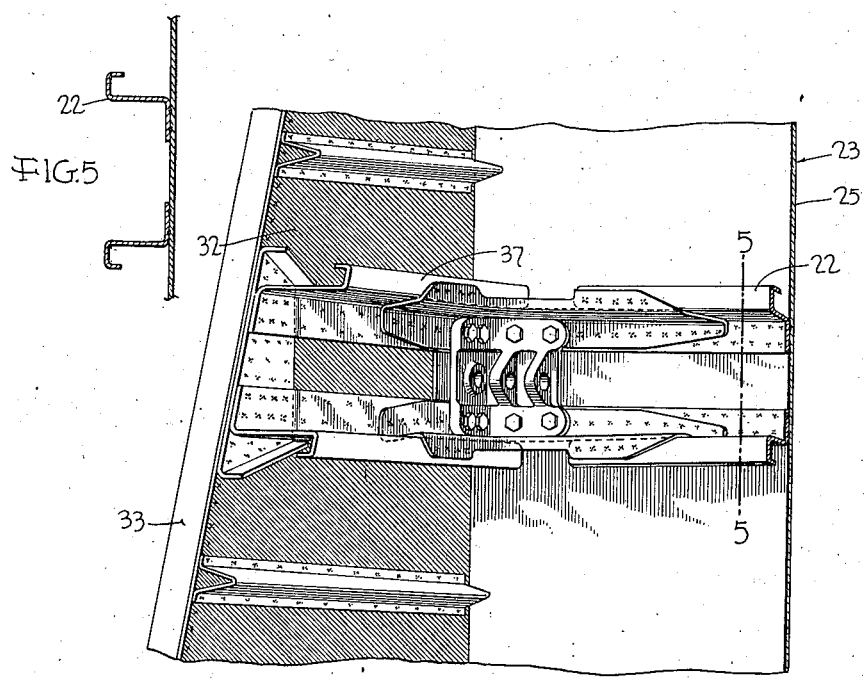
FIG.5
FIG.4
INVENTOR
Michael Watter
BY John P. Tarbox
ATTORNEY

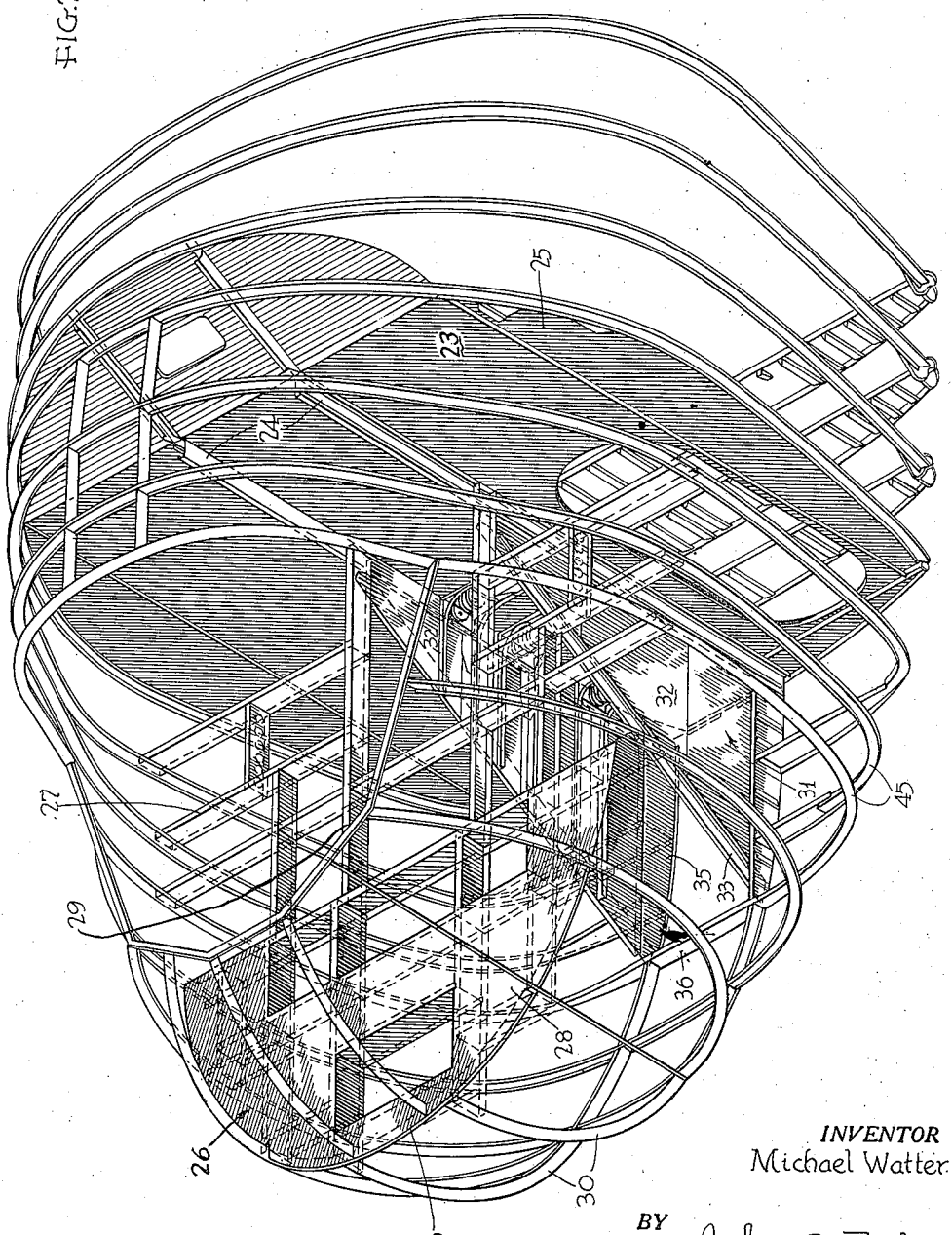

2,405,918

UNITED STATES PATENT OFFICE 2,405,918

AIRPLANE CONSTRUCTION

Michael Watter, Philadelphia, Pa., assignor to Edward G. Budd Manufacturing Company, Philadelphia, Pa., a corporation of Pennsylvania Application May 13, 1944, Serial No. 535,461

14 Claims. (Cl. 244—119)

This invention relates to airplane construction, particularly to airplanes having tricycle landing gear with one wheel located in the nose of the fuselage, and has for an object the provision of improvements in this art. The present invention is an improvement upon that disclosed in the application of Michael Watter, Serial No. 451,390, filed July 18, 1942.

One of the particular objects of the invention is to provide in the nose of a semi-monocoque fuselage a construction which efficiently takes and distributes the loads imposed through the nose landing wheel.

Another object is to distribute these loads through a fuselage bulkhead and a pilot's platform or flight deck into the walls of the fuselage nose.

The enumerated and other objects and advantages of the invention will be apparent from the following description of an exemplary embodiment thereof, reference being made to the accompanying drawings wherein:

Figure 1 is a side elevation, partly in section, of an airplane embodying the invention;

Figure 2 is a skeletonized top isometric view;

Figure 4 is a localized perspective view in the zone 4 of Figure 3; and

Figure 5 is a section taken on the line 5—5 of Figure 4.

Figure 3:
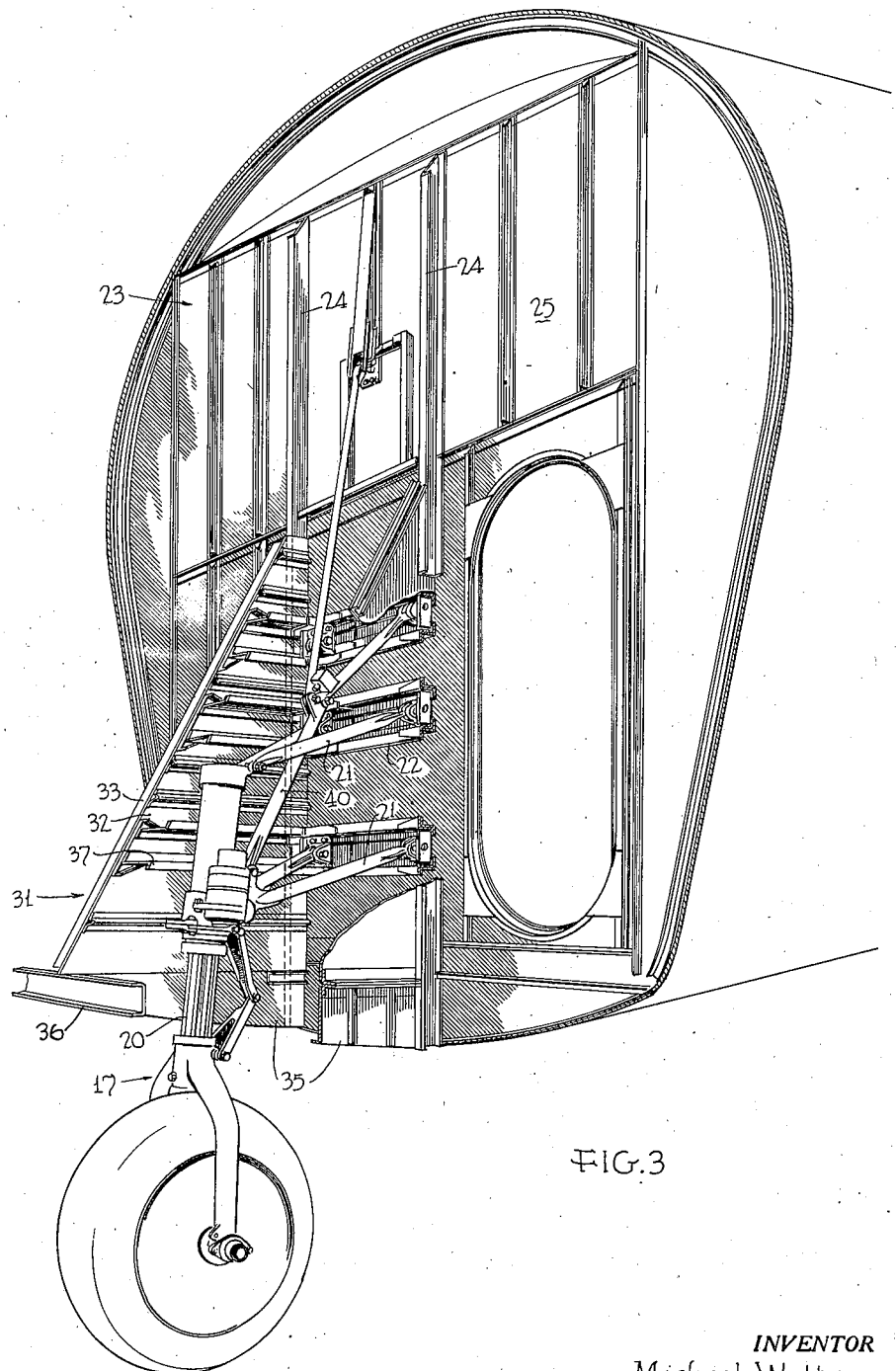
Figure 3 is a side front view of the landing gear and related structure.

Referring to the drawings, the airplane includes a fuselage 10, wings 11, nacelle 14, propellers 15, main landing wheels 16, and a nose landing wheel 17. The main landing wheels are located on the nacelles near the center of gravity and while the airplane is at rest the major portion of the weight is carried thereon and only a small proportion on the nose wheel and strut; but if a low nose landing is made a very heavy load may be placed on the nose wheel and this concentrated load is efficiently distributed into the adjacent body structure whereby to avoid undue localized stresses and buckling.

The nose wheel strut 20 is supported upon a plurality of pairs of spaced arms 21 hinged to heavy horizontal reinforcing frame members 22 of a strong bulkhead 23. Inasmuch as the bulkhead is designed to stop the forward movement of cargo in case of an accident, it is referred to as the crash bulkhead. The horizontal members 22 are secured to two heavy spaced vertical frame members or struts 24 of the bulkhead, a continuous sheet web 25 filling the space between and beyond the heavy frame members.

The space behind the bulkhead is left unobstructed for cargo, hence the bulkhead is unbraced rearwardly interiorly. Heavy loads on the nose landing gear tend to push the interior of the bulkhead rearwardly. The structure hereby provided tends to prevent this deformation.

The flight deck 26 is located above the level of the major portion of the cargo-carrying space, its rear end being secured to the bulkhead and its sides and front end being secured to the enclosing walls of the nose. The flight deck is formed of frame members 27 and connecting sheet metal webs 28 adjacent the front end. Among the frame members there are two longitudinals 29 which extend from the vertical frame members 24 of the bulkhead to the front of the nose. At the nose they connect to two frame members 30 which extend downwardly and rearwardly to the bulkhead.

The nose wheel retracts into a well 31 which is connected at the rear to the bulkhead, and at the bottom to the bottom wall of the nose enclosure. The side walls 32 of the well are of heavy frame and sheet web construction aligned with and secured to the spaced bulkhead verticals 24 and the spaced nose longitudinals 30. The upper diagonal edges of the well side walls are braced by heavy diagonal frame members 33 and connected by steps 34. The side walls include horizontal frame members 37 which are secured to the bulkhead horizontals 22 and to the diagonals 33.

The bottom shell of the body at the bottom of the wheel well comprises deep side plates 35 and an end plate 36. The side plates 35 comprise part of the spaced longitudinals from the nose and the end plate 36 forms a connection across and between side plates and longitudinals.

The wheel and strut are raised and lowered by a hinged drag strut 40 and suitable motive means (not shown) supported on the bulkhead at a distance above the arms 21.

The step treads may be made of plywood but the risers are preferably formed of substantial metal framing to form a strong tie across the inclined front ends of the well side walls.

The transverse frame members of the flight deck connect at their ends with vertical ribs or bulkheads 45 of the nose shell. At the front of the nose shell where the shear panel plate 28 is provided there is secured a horizontal frame member 46 to which the plate is attached.

It is thus seen that the loads which are imposed upon the bulkhead are in part transmitted through it directly to the sides of the body. This largely takes care of direct vertical thrust loads. Insofar as buckling loads on the bulkheads are concerned, these are partly absorbed by the rigid framework associated with the bulkhead, including the strong vertical struts 24 and the well framing. The well framing transmits its load to the very deep side plates 35 of the bottom shell to which it is secured. The other part of the buckling load is carried forward by the flight deck framing and spread throughout the girth of the nose shell. Largely the load passes up the strong spaced deck longitudinals 29 and passes down and back through the nose longitudinals 30 to the bottom shell plates 35. The flight deck rigidly ties the sides of the nose shell together to prevent deformation under the loads imposed, the shear panel 28 and horizontal frame element 46 being effective for distributing the load and rigidifying the nose shell at the front.

In addition to the buckling load imposed by the landing gear, there is a winch 48 mounted on the bulkhead in the cargo compartment for pulling cargo up a rear ramp 49. The winch is mounted near the mid-height of the bulkhead approximately behind the end of the flight deck where it will least tend to buckle the bulkhead.

While one embodiment of the invention has been described for purposes of illustration it is to be understood that there may be various embodiments within the limits of the prior art and the scope of the subjoined claims.

What is claimed is:

1. An airplane comprising in combination, a fuselage including an enclosed nose, a nose bulkhead, a nose landing wheel and strut means secured to said bulkhead, a flight deck secured at its rear end to the upper part of said bulkhead, said deck being secured at its sides and front end to the enclosing walls of the fuselage nose, and longitudinal frame members extending up said bulkhead, forward along the deck, and downward and rearward along the nose walls to a point of connection with the bulkhead in the wheel attachment region.

2. An airplane comprising in combination, a fuselage including an enclosed nose, a nose bulkhead, a deck secured at its rear end to the bulkhead at a distance above the lower edge and at its front end to the fuselage nose enclosure, said bulkhead including a pair of spaced vertical struts extending from the lower edge to the deck, said deck including a pair of beam members secured to the bulkhead struts and extending forward to the front wall of the nose, said nose enclosure including a pair of frame members secured to the deck beams and extending downward and rearward to the lower ends of the bulkhead struts, and a nose landing gear mounted on the rear portion of the enclosed frame structure thus formed.

3. An airplane comprising in combination, a fuselage including an enclosed nose, a nose bulkhead, a deck secured at its rear end to the bulkhead and at its front end to the nose enclosure, frame elements forming a closed loop up the bulkhead, forward along the deck, and downward and rearward along the nose enclosure to the base of the bulkhead, landing gear mounted on the fuselage in the region where the frame elements join at the bulkhead, and lateral frame members in said deck for transferring loads into the sides of the nose enclosure.

4. An airplane comprising in combination, a fuselage including an enclosed nose, a nose bulkhead, a deck secured at its rear end to the bulkhead and at its front end to the nose enclosure, frame elements forming an enclosure up the bulkhead, forward along the deck, and downward and rearward along the nose enclosure to the base of the bulkhead, and landing gear mounted on the fuselage in the region where the frame elements join the bulkhead, said deck including lateral frame members on each side connecting the longitudinal frame elements to the sides of the nose enclosure, and at its front end the deck including sheet web shear panels connecting the frame members and elements.

5. An airplane comprising in combination, a fuselage including an enclosed nose, a nose bulkhead, spaced vertical struts carried by the bulkhead near the horizontal center, a nose landing gear secured by struts to the bulkhead adjacent the vertical struts, and load-carrying elements connecting the bulkhead intermediate its height to the nose enclosure.

6. An airplane comprising in combination, a fuselage including an enclosed nose, a transverse nose bulkhead, a nose landing gear secured by struts to the bulkhead, load-carrying elements connecting the bulkhead intermediate its height to the nose enclosure, and a vertical longitudinal wall connected between the load-carrying elements and the lower part of the nose enclosure forward of the bulkhead.

7. An airplane comprising in combination, a fuselage including a nose portion, a bulkhead in the nose at a distance behind the front end, nose landing gear on the fuselage adjacent the bulkhead, a framed bottom well in the fuselage for the landing gear, the frame of the well at its rear being secured to the bulkhead and at its bottom to the fuselage nose enclosure, and a lateral tie frame structure in said fuselage secured at its rear end to the bulkhead at the top of the well frame and secured at its front end to the fuselage nose enclosure, said platform having an opening at the top of the well, and the frame of the well including steps on the front end, which extend to the platform opening.

8. An airplane comprising in combination, a fuselage, a bulkhead in said fuselage at a distance behind the front end, means including landing gear imposing a buckling load on said bulkhead, and frame means extending in a loop from the bottom up the bulkhead to a point intermediate the height of the bulkhead, thence forwardly to the front end, thence down the front end and back along the bottom of the fuselage to the starting point at the bottom of the bulkhead.

9. An airplane comprising in combination, a fuselage including a nose shell portion, a full bulkhead in the fuselage behind the front end of the nose, the bulkhead at its lower end being connected to the bottom of the fuselage, nose landing gear on the fuselage located adjacent the bulkhead and having anchorage to the bulkhead intermediate its height and width whereby to impose a dishpanning buckling load on the bulkhead, and a lateral tie frame structure in said fuselage secured at its rear end to said bulkhead intermediate its height and secured at its front end to the front of the fuselage nose shell whereby to relieve the bulkhead of buckling distortion loads imposed by the landing gear and transmit them into the fuselage nose shell.

10. An airplane comprising in combination, a fuselage including a nose shell portion, a full bulkhead in the fuselage behind the front end of the nose, the bulkhead at its lower end being connected to the bottom of the fuselage, a framed well in the bottom of the fuselage secured to the bulkhead and the nose shell portion, nose landing gear on the fuselage located at the well and having anchorage to the bulkhead intermediate its height and width whereby to impose a dishpanning buckling load on the bulkhead, and a lateral tie frame structure in said fuselage secured at its rear end to said bulk head intermediate its height and secured at its front end to the fuselage nose shell whereby to relieve the bulkhead of buckling distortion loads imposed by the landing gear and transmit them into the fuselage nose shell.

11. An airplane comprising in combination, a fuselage including a nose portion, a full bulkhead in the nose at a distance behind the front end, the bulkhead at its lower end being connected to the bottom of the fuselage, nose landing gear on the fuselage adjacent the bulkhead and having anchorage to the bulkhead intermediate its height and width whereby to impose a dishpanning buckling load on the bulkhead, a framed bottom well in the fuselage for the landing gear, the frame of the well at its rear being secured to the bulkhead and at its bottom to the fuselage nose enclosure, and a lateral tie frame structure in said fuselage secured at its rear end to the bulkhead at the top of the well frame and secured at its front end to the fuselage nose enclosure.

12. An airplane comprising in combination, a fuselage including a nose portion, a full height bulkhead in the nose at a distance behind the front end, nose landing gear on the fuselage adjacent the bulkhead and having anchorage to the bulkhead intermediate its height and width whereby to impose a dishpanning buckling load on the bulkhead, a framed bottom well in the fuselage for the landing gear, the frame of the well at its rear being secured to the bulkhead and at its bottom to the fuselage nose enclosure, and a lateral tie frame structure in said fuselage secured at its rear end to the bulkhead at the top of the well frame and secured at its front end to the fuselage nose enclosure whereby to relieve the bulkhead of buckling distortion loads imposed by the landing gear and transmit them into the fuselage nose shell.

13. An airplane comprising in combination, a fuselage enclosure, a full transverse bulkhead in said fuselage enclosure, means including structural connections imposing a load on said bulkhead directed longitudinally of the fuselage tending to cause it to buckle or dishpan in its portion intermediate its side and upper and lower edges, and longitudinal frame means secured between the intermediate portion of the bulkhead and the fuselage enclosure to prevent buckling of the bulkhead.

14. In an airplane, in combination, a housed-in structure longitudinally of streamlined form, an internal frame element of the structure adjacent one longitudinal terminus of said structure, a landing gear connected structurally to said element and when the structure is borne upon the gear subjecting the element to a bending moment which tends to distort it and divert it from its true plane, together with a longitudinally extending moment-counteracting tie member tying the portion of said element subjected to the bending moment to the adjacent terminus of said structure.

MICHAEL WATTER.